United States Patent
Schwartz et al.

(10) Patent No.: US 8,621,486 B2
(45) Date of Patent: Dec. 31, 2013

(54) SIGNIFICANCE LEVEL AUTOMATION

(75) Inventors: Dror Schwartz, Yehud (IL); Amir Kessner, Ramat-Gan (IL); Meidan Zemer, Hod-Hasharon (IL); Michal Barak, Kiryat Ono (IL); Svetlana Aronov, Rehovot (IL); Sagi Monza, Rishon-Lezion (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 428 days.

(21) Appl. No.: 12/827,134

(22) Filed: Jun. 30, 2010

(65) Prior Publication Data
US 2012/0005689 A1    Jan. 5, 2012

(51) Int. Cl.
G06F 3/00 (2006.01)

(52) U.S. Cl.
USPC .......................................... 719/318

(58) Field of Classification Search
USPC ................................. 719/310, 318
See application file for complete search history.

(56) References Cited

U.S. PATENT DOCUMENTS

| | | | |
|---|---|---|---|
| 5,089,919 A * | 2/1992 | Kozuki et al. | 360/74.4 |
| 7,702,464 B1 * | 4/2010 | Emig et al. | 702/19 |
| 8,161,481 B2 * | 4/2012 | May | 718/102 |
| 2002/0178226 A1 * | 11/2002 | Anderson et al. | 709/206 |
| 2004/0172253 A1 | 9/2004 | Singh | |
| 2006/0253742 A1 | 11/2006 | Elenburg et al. | |
| 2007/0234217 A1 * | 10/2007 | Miller et al. | 715/738 |
| 2008/0092119 A1 | 4/2008 | Sweis | |
| 2008/0196058 A1 * | 8/2008 | Terada et al. | 725/32 |

OTHER PUBLICATIONS

Mendel Rosenblum, Using the SimOS Machine Simulator to Study Complex Computer Systems, 1997.*

* cited by examiner

Primary Examiner — Lechi Truong

(57) ABSTRACT

Techniques for using action significance levels in an automation system are disclosed herein. In one embodiment, an automation system includes an event detector, and event analyzer, and a player. The event detector is configured to detect an event affecting execution of an application being monitored by the automation system. The event analyzer is configured to analyze a detected event and determine importance of an action causing the event to operation of the application. Based on the determined importance, the event analyzer assigns one of a plurality of predetermined significance levels to the action. The player is configured to reproduce each action assigned a significance level at least as high as a selected replay level and to not reproduce any action assigned a significance level lower than the replay level.

17 Claims, 3 Drawing Sheets

SIGNIFICANCE LEVEL AUTOMATION

BACKGROUND

Application programs, including web-based applications such as web pages, and the hardware associated with the applications, are often tested under extreme use conditions. Such conditions may be provided by a system that simulates a number of users simultaneously executing the application. A user may be simulated by execution of a program, for example a previously acquired script that provides appropriate user inputs and responses to exercise the application. A script acquisition system vets user actions to determine which are to be included in a script.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
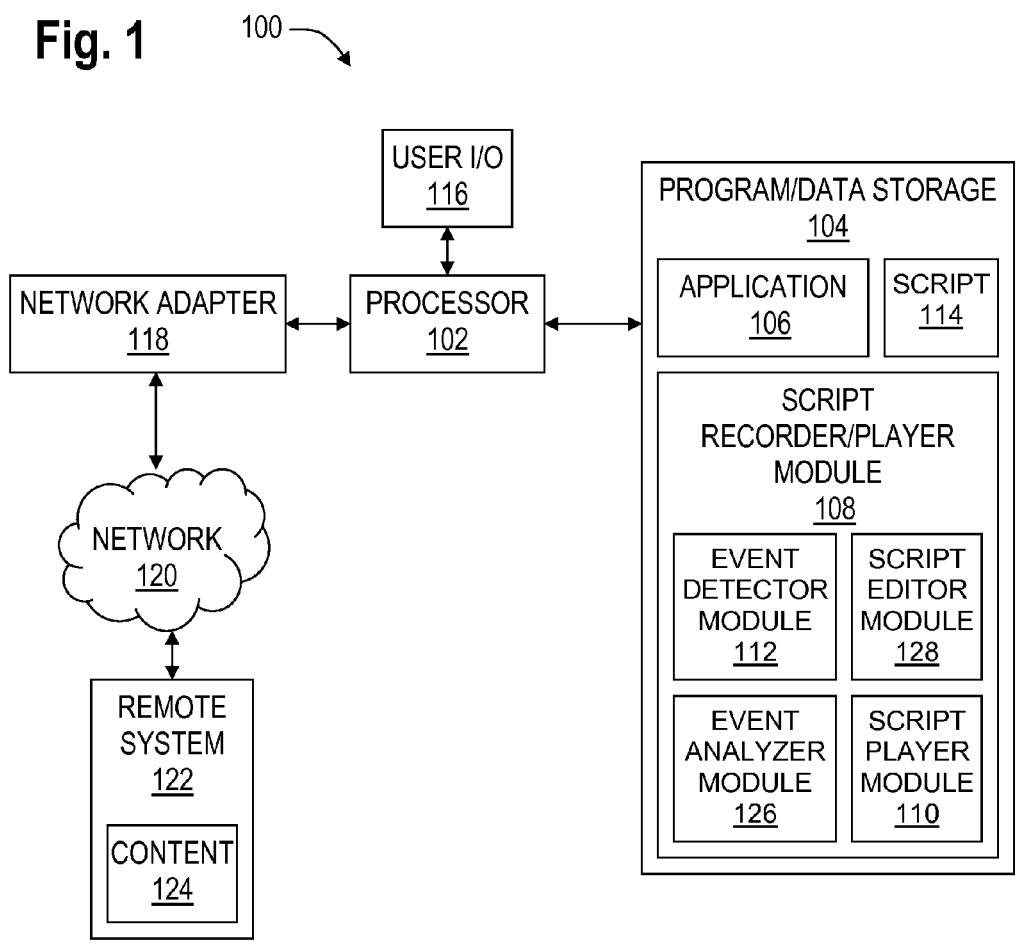
FIG. 1 shows a block diagram for a system that includes multi-level script generation and playback in accordance with various embodiments.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. Further, the term "software" includes any executable code capable of running on a processor, regardless of the media used to store the software. Thus, code stored in memory (e.g., non-volatile memory), and sometimes referred to as "embedded firmware," is included within the definition of software.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

When generating a script to automate operation of an application, determining which user actions directed to the application are necessary for emulating the business process applied by the user can be challenging. Scripting all user actions leads to a long and unmaintainable script. Furthermore, each action replayed by the script presents a point of potential failure should the application or its behavior change. On the other hand, scripting only high-level user actions can also be problematic because seemingly insignificant user actions may be essential for properly replicating the business process applied by the user.

Embodiments of the present disclosure employ a multi-level automation script wherein each user action that generates an event detected by the script recorder is recorded and assigned a level of significance to the business process. On script replay, actions assigned at least a selected significance level are replicated while actions assigned a lower significance level are not replicated. The significance level selected for replay (i.e., the replay level) is user selectable. Thus, embodiments allow script playback using various resolutions of replicated user actions.

FIG. 1 shows a block diagram for an embodiment of a system 100 that includes multi-level script generation and playback in accordance with various embodiments. The system 100 includes program/data storage 104 and one or more processors 102. Some embodiments of the system 100 also include a network adapter 118 and user I/O devices 116. These elements of the system 100 may be embodied in a computer as is known in the art. Desktop computers, server computers, notebook computers, handheld computers, etc. are exemplary computers that may suitably embody components of the system 100.

The processor 102 is configured to execute instructions read from a computer readable medium, and may, for example, be a general-purpose processor, digital signal processor, microcontroller, etc. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems.

The program/data storage 104 is a computer-readable medium coupled to and accessible to the processor 102. The storage 104 may be volatile or non-volatile semiconductor memory (e.g., FLASH memory, static or dynamic random access memory, etc.), magnetic storage (e.g., a hard drive, tape, etc.), optical storage (e.g., compact disc or digital versatile disc), etc. Various programs executable by the processor 102, and data structures manipulatable by the processor 102 may be stored in the storage 104.

User I/O devices 116 coupled to the processor 102 may include various devices employed by a user to interact with the processor 102 based on programming executed thereby. Exemplary user I/O devices 116 include video display devices, such as liquid crystal, cathode ray, plasma, organic light emitting diode, vacuum fluorescent, electroluminescent, electronic paper or other appropriate display panels for providing information to the user. Such devices may be coupled to the processor 102 via a graphics adapter. Keyboards, touchscreens, and pointing devices (e.g., a mouse, trackball, light pen, etc.) are examples of devices includable in the I/O devices 116 for providing user input to the processor 102 and may be coupled to the processor by various wired or wireless communications subsystems, such as Universal Serial Bus or Bluetooth.

The network adapter 118 may coupled to the processor 102 to allow the processor 102 to communicate with a remote system 122 via the network 120, and to, for example, acquire content 124 (e.g., web pages, applications, images, audio, etc.) from the remote system 122. The network adapter 118 may allow connection to a wired or wireless network, for example, in accordance with IEEE 802.11, IEEE 802.3, Ethernet, a cellular network, etc. The network 120 may comprise any available computer networking arrangement, for example, one or more of a local area network ("LAN"), a wide area network ("WAN"), a metropolitan area network ("MAN"), the internet, etc. Further, the network 120 may comprise any of a variety of networking technologies, for example, wired, wireless, or optical techniques may be employed. Accordingly, the remote system 122 is not restricted to any particular location or proximity to the processor 102.

Referring again to the program/data storage 104, various data and program modules are shown stored therein. The application 106 may be, for example a web page, web application, or other application to be automated. The application 106 may comprise a portion of the content 124 provided by the remote system 122. In some embodiments, the application 106 represents a portion of an application retrieved from the remote system 122 wherein different portions of the application 106 are executed by the processor 102 and a different processor of the remote system 122. The application 106 may include executable programming and various user selectable/modifiable control features (e.g., links, buttons, text entry, etc).

The script recorder/player module 108, when executed by the processor 102, monitors events affecting the operation of the application 106. Some such events are caused by user action directed to the application 106, such as data entry, control operations, etc. The script recorder/player module 108 analyzes the detected events and effects on the application 106 ensuing from the detected events, and records various user actions causing the events as steps in the script 114. The script recorder/player module 108 is also executes the script 114 to replicate the user actions previously recorded.

The script recorder/player module 108 includes an event detector module 112, an event analyzer module 126, a script editor module 128, and a script player module 110. The event detector module 112 configures the processor 102 to detect various events in the system 100 related to execution of the application 106. The event detector module 112 may include one or more event detection sub-systems that detect events caused by user actions directed to the application 106. For example, the event detector module 112 may be configured to detect a user input event, such as movement or selection via a pointing device (e.g., a user input device 116).

The event analyzer module 126 configures the processor 102 to analyze each event detected by the event detector module 112 and determines how important the user action that triggered the event is to the operation of the application 106. For example, clicking a radio button may be deemed very important, while moving a cursor may be deemed less important. Embodiments of the event analyzer module 126 assign one of a plurality of levels of significance to each user action. In some embodiments, the event analyzer module 126 recognizes three levels of significance. Each level may represent a different degree of event resolution. Some embodiments employ levels designated NORMAL, HIGH, and MAX, where actions assigned to the NORMAL level are deemed most significant, and actions assigned to the MAX level are deemed least significant.

The event analyzer module 126 may apply various criteria and heuristics to determine the significance of a user action. In some embodiments, the event analyzer module 126 determines user action significance based on the kind or class of the action causing a detected event. For example, clicking on an object may be deemed more significant than moving a cursor over an object. Thus, the significance level of various classes of action may be predetermined.

Some embodiments of the event analyzer module 126 determine the significance of a user action based on whether the action causes any change in the application 106 or in data related to the application 106. The event analyzer module 126 can monitor the application 106 for changes responsive to a user action. For example, if a user action causes a data value displayed or used by the application 106 to change, the event analyzer may assign a higher level of significance to the action than would be assigned to an action that causes no change in the application 106. In some embodiments, the event analyzer module 126 compares state information of the application 106 before and after a detected event to determine whether a user action caused a change in the application 106.

The event analyzer module 126 may assign a level of significance to an action based on the class or type of object to which the action is directed. For example, clicking on a text may not necessarily cause any operation related to the user directed business process while clicking on a link or radio button is more likely to cause operations relevant to the business process. Therefore, a user action directed to a radio button may be assigned a higher significance level than the same action directed to a text box.

The event analyzer module 126 may also analyze a set of events to determine the meaning of the events in the context of the application 106. Based on the determined meaning of the set of events, the event analyzer module 126 may change the significance level previously assigned to a user action and/or define a composite user action that encompasses the set of events and assign an appropriate significance level to the composite action. For example, a mouse down operation directed to an object of the application 106 may be assigned to a first level of significance. A subsequent mouse up operation directed to the object may identify the mouse-down-mouse-up as a click, and consequently, the event analyzer may promote the mouse-down to a higher level of significance. Alternatively, the event analyzer may record the mouse-down-mouse-up as a click.

Similarly, detected changes in the application 106 associated with a previously classified user action may serve to promote the prior user action to a higher level of significance. For example, a mouse-down event associated with an object is detected and a level of significance is assigned to the corresponding user action. Subsequent mouse movement events are thereafter detected, and associated with the mouse movement events, a change in a data value of the application 106 is detected. The change in application 106 data value may indicate that the mouse-down and mouse movement events are directed to changing a value by moving a slider control, and consequently result in promotion of the actions causing the events to a higher level of significance and/or definition of a slider movement event having an appropriate level of significance.

Each user action classified by the event analyzer module 126 is recorded in the script 114. The script player module 110 configures the processor 102 to replay the script 114 based on a selected level of significance (i.e., replay level). Thus, if each user action was assigned to one of three significance levels when recorded, then the script may be replayed at any selected one of the three levels. Based on selection of replay level, user actions assigned to the selected level or a level higher than the selected level will be replicated, and user actions assigned to a level lower than the selected level will not be replicated. For example, if the NORMAL level is selected for replay, only user actions assigned to the NORMAL level will be replicated. If the HIGH level is selected for replay, only user actions assigned to either the HIGH level or the NORMAL level will be replicated. If the MAX level is selected for playback, user actions assigned to any of the NORMAL, HIGH, or MAX level will be replicated.

The script editor module 128 configures the processor 102 to allow a user to manually assign a recorded user action to a selected playback level. For example, if playback at a NORMAL replay level of the script 114 as recorded fails to adequately simulate user operation of the application 106, the script editor module 128 can be used to promote selected user actions from a lower level to the NORMAL level until replay at the NORMAL level manipulates the application 106 as desired.

Thus, embodiments of the present disclosure provide for recording a single script 114 that can be replayed at multiple selectable levels of resolution. Each user action recorded in the script 114 is assigned a level of significance to the operation of the application. The level of significance assigned to an action that can be changed via the script editor module 128 allowing replay performance at each level to be altered after the script is recorded.

Figure 2:
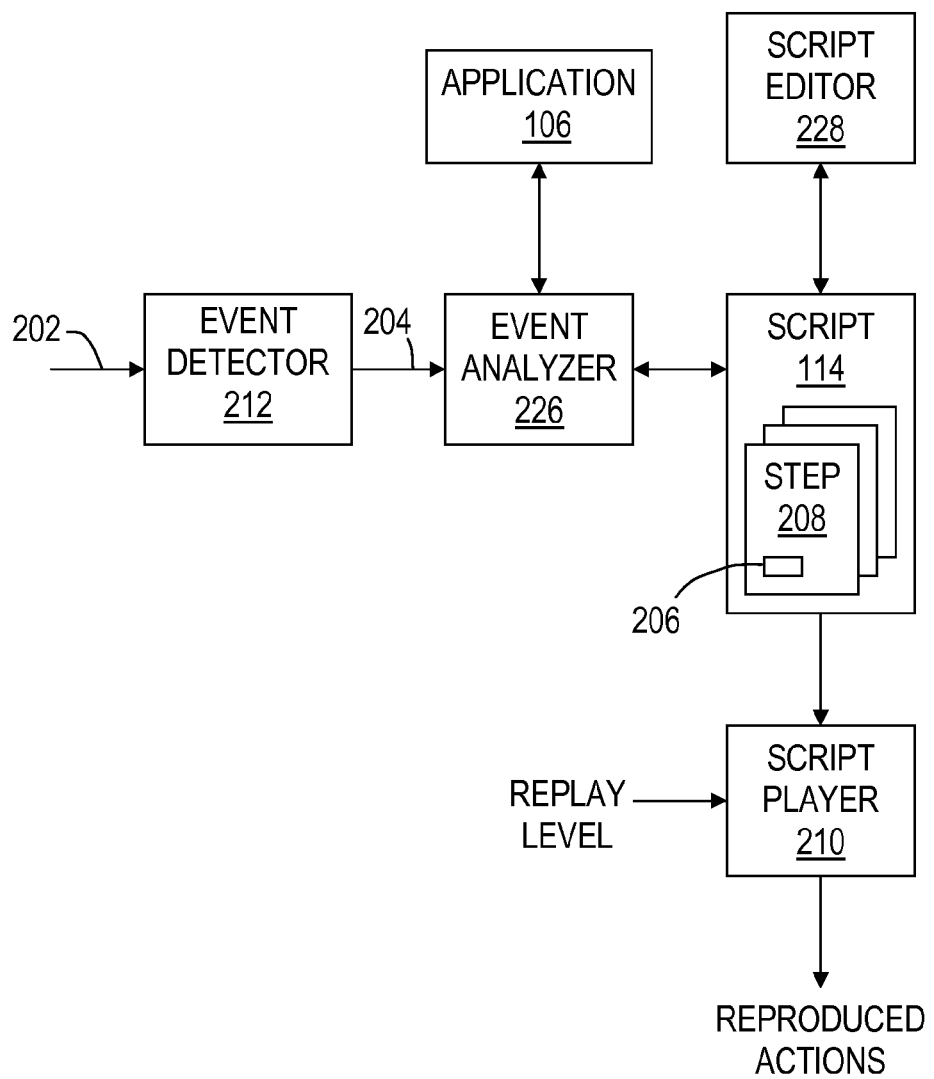
FIG. 2 shows a block diagram for a system for multi-level script generation and playback in accordance with various embodiments.

FIG. 2 shows a block diagram for a system for multi-level script generation and playback in accordance with various embodiments. Each user action directed to the application 106 is recorded in the script 114 as step 208. Each step 208 includes a significance level 206, i.e., a value indicating a level of significance of the user action to operation of the application 106.

An event 202 is generated in response to a user action, such as use of an input device 116 for pointer movement, control or data input, etc. The event detector 212 detects the event 202 and provides event information 204 to the event analyzer 226. The event analyzer 226 analyzes various characteristics of the event 202 and/or the application 106 to determine which one of a plurality of levels of significance to assign to the user action that caused the event 202. For example, the event analyzer 226 may analyze the event 202 (e.g., determine the event type), and/or the response of the application 106 to the event 202, and/or the objects of the application 106 to which the event 202 is directed, and/or a relationship of the event 202 to previous events, and/or the effect of a set of events on the application 106 to determine a significance level of the user action causing the event.

A step 208 representing each action causing an event and a corresponding significance level 206 of the action to the operation of the application 106 are stored in the script 114. The script player 210 replays the script 114 by replicating the actions represented by the steps 208 having a significance level 206 at least as high as a replay level selected by the user. The replay level can be selected to replicate more or fewer actions, where more actions are generally replicated if the replay level is selected to replicate less significant actions.

The script editor 228 accesses the script 128 to manipulate the significance levels 206 assigned to the steps 202. Thus, the script editor 228 allows a user to change the significance level 206 assigned to a step 202, thereby changing the actions replicated at a selected replay level.

Embodiments of event detector 212, event analyzer 226, script player 210, and script editor 228 can be implemented as dedicated circuitry and/or one or more processors (e.g., processor 102) programmed to provide the functions described herein.

Figure 3:
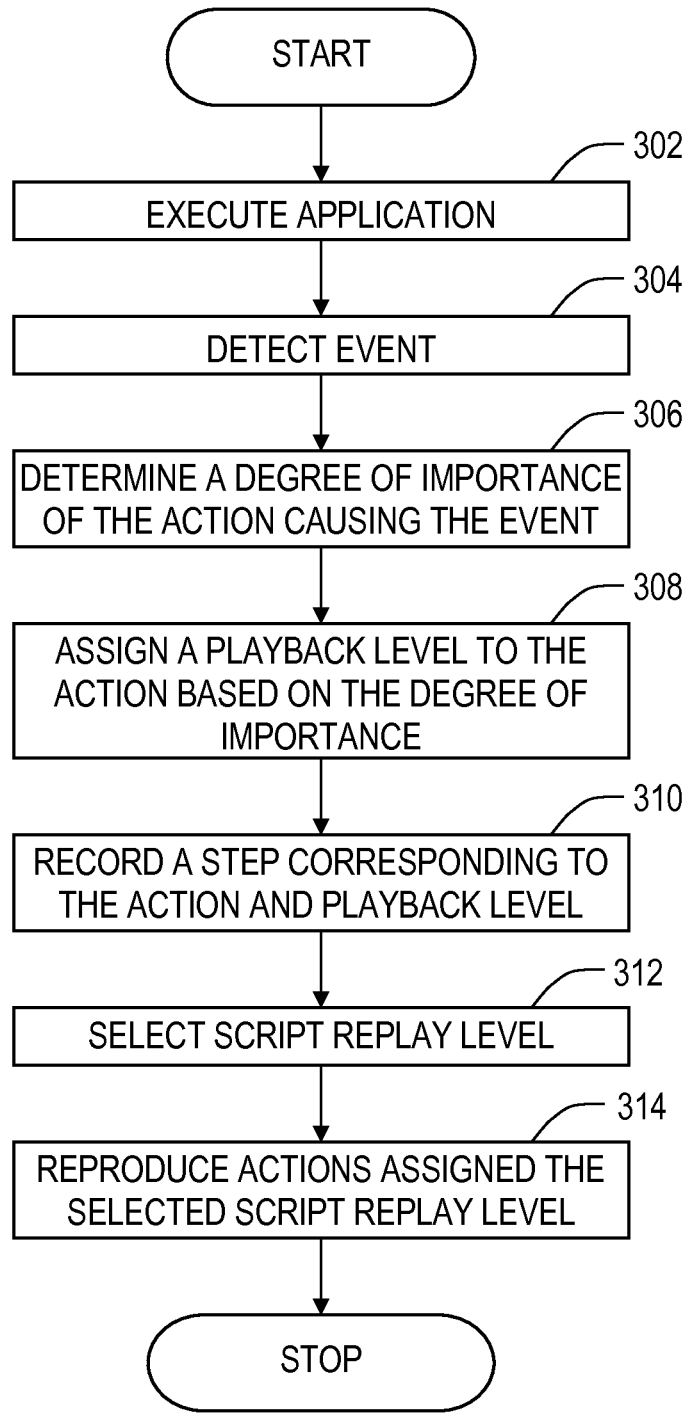
FIG. 3 shows a flow diagram for a method for multi-level script generation and playback in accordance with various embodiments.

FIG. 3 shows a flow diagram for a method for multi-level script generation and playback in accordance with various embodiments. Though depicted sequentially as a matter of convenience, at least some of the actions shown can be performed in a different order and/or performed in parallel. Additionally, some embodiments may perform only some of the actions shown. In some embodiments, the operations of FIG. 3, as well as other operations described herein, can be implemented as instructions stored in a computer readable medium and executed by one or more processors (e.g., the processor 102).

In block 302, an application program 106 is executing on the system 100. The application 106 may be a web application downloaded in whole or in part from the remote system 122 for execution by the processor 102 in a browser, or in some embodiments outside a browser. The system 100 is configured to record actions affecting the application 106 for future playback. Playback of the recorded actions allows operation of the application 106 to be automated.

In block 304, the event detector 212 detects an event 202 that may affect the application 106. For example, a user may select, via a user input device 116 (e.g., by clicking), an object displayed by the application 106, or move a cursor across a display. The event detector 212 provides event information 204 to the event analyzer 226.

In block 306, the event analyzer 226 determines a degree of importance of the action causing the event 202 to operation of the application 106. For example, actions that cause a change in the state of the application 106 may be more important that actions that cause no change.

In block 308, the event analyzer 226 assigns one of a plurality of significance levels to the action based on the determined degree of importance of the action to operation of the application 106.

In block 310, the event analyzer 226 records a step 208 corresponding to the action causing the event 202 in the script 114. The step 208 includes the significance level value 206 assigned to the action. When the step 208 is replayed, the action causing the event 202 will be replicated.

In block 312, a script replay level is selected. The replay level may correspond to any of the significance levels assigned to user actions and included in steps 208 recorded in the script 114.

In block 314, the script player 210 plays the script 114 at the selected replay level. Each step 208 including a significance level 206 at least as high as the selected replay level will be executed to automate operation of the application 106 by reproducing the user actions corresponding to each step 208.

The above discussion is meant to be illustrative of the principles and various embodiments of the present invention. Numerous variations and modifications will become apparent to those skilled in the art once the above disclosure is fully appreciated. For example, while automation of an application via multi-level script has been generally described by reference to a web application, those skilled in the art will understand that embodiments are applicable to automating a variety of different applications. It is intended that the following claims be interpreted to embrace all such variations and modifications.

What is claimed is:

1. An automation system, comprising:
an event detector configured to detect an event affecting execution of an application being monitored by the automation system;

an event analyzer comprising a processor configured to analyze a detected event and determine importance of an action causing the event to operation of the application, and based on the determined importance to assign one of a plurality of predetermined significance levels to the action;

a player configured to reproduce each action assigned a significance level at least as high as a selected replay level and to not reproduce any action assigned a significance level lower than the replay level; and an event editor configured to change the significance level assigned to an action based on user input.

2. The automation system of claim 1, wherein the event analyzer is configured to assign a significance level to the action based on a type of the action and a predetermined importance assigned to the type.

3. The automation system of claim 1, wherein the event analyzer is configured to analyze a response of the application to the event and assign a significance level to the action based on the response.

4. The automation system of claim 1, wherein the event analyzer is configured to assign a significance level to the action based on a type of an object of the application affected by the action.

5. The automation system of claim 1, wherein the event analyzer is configured to assign a significance level to the action based on a result of the event in the application, wherein the result is based on a plurality of actions that includes the action.

6. The automation system of claim 1, wherein each of the significance levels is indicative of a different degree of detail of action recorded.

7. The automation system of claim 1, wherein the player is configured to allow selection of the replay level from a plurality of replay levels corresponding to the plurality of significance levels.

8. The automation system of claim 1, wherein the system records all actions causing a detected event, and the event analyzer assigns one of the plurality of significance levels to each action.

9. The automation system of claim 1, wherein the event analyzer is configured to change the significance level of a first action based on subsequent detection of a different event related to a second action.

10. A method, comprising:

executing, by one or more processors, an application program;

detecting, by the one or more processors, an event affecting the execution of the application program, wherein the application program is being monitored by an automation system;

analyzing the detected event, and determining, by the one or more processors, a degree of importance of an action causing the event to operation of the application;

assigning, based on the determined importance, one of a plurality of predetermined significance levels to the action;

reproducing each action assigned a significance level at least as high as a selected replay level and not reproducing any action assigned a significance level lower than the replay level; and providing an event editor that enables changing the significance level assigned to an action based on user input.

11. The method of claim 10, further comprising assigning the significance level to the action based on one or more of a type of the action and a predetermined importance assigned to the type, a response of the application to the event, a type of object of the application affected by the action, and a result of the event in the application.

12. The method of claim 10, further comprising changing the significance level of a first action based on subsequent detection of a different event related to a second action.

13. The method of claim 10, further comprising recording all actions causing a detected event, and assigning one of the plurality of significance levels to each action.

14. A non-transitory computer-readable medium encoded with a computer program that when executed causes one or more computers to:

detect an event affecting an application executing on the one or more computers and being monitored by an automation system;

analyze the detected event, and determine a degree of importance of an action causing the event to operation of the application;

assign, based on the determined importance, one of a plurality of predetermined significance levels to the action;

reproduce each action assigned a significance level at least as high as a selected replay level and not reproduce any action assigned a significance level lower than the replay level; and provide an event editor that enables changing the significance level assigned to an action based on user input.

15. The computer-readable medium of claim 14, further encoded with a computer program that causes assignment of the significance level to the action based on one or more of a type of the action and a predetermined importance assigned to the type, a response of the application to the event, a type of object of the application affected by the action, and a result of the event in the application.

16. The computer-readable medium of claim 14, further encoded with a computer program that changes a significance level previously assigned to a first action based on subsequent detection of a different event caused by a second action.

17. The computer-readable medium of claim 14, further encoded with a computer program that records all actions causing a detected event, and assigning one of the plurality of significance levels to each action.

* * * * *